United States Patent
Basso et al.

(10) Patent No.: US 7,283,529 B2
(45) Date of Patent: Oct. 16, 2007

(54) METHOD AND SYSTEM FOR SUPPORTING A DEDICATED LABEL SWITCHED PATH FOR A VIRTUAL PRIVATE NETWORK OVER A LABEL SWITCHED COMMUNICATION NETWORK

(75) Inventors: Claude Basso, Raleigh, NC (US); Brahmanand K. Gorti, Cary, NC (US); Natarajan Vaidhyanathan, Greensboro, NC (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 10/383,973

(22) Filed: Mar. 7, 2003

(65) Prior Publication Data

US 2004/0174879 A1  Sep. 9, 2004

(51) Int. Cl.
*H04L 12/28* (2006.01)
*H04L 12/56* (2006.01)
*G06F 15/173* (2006.01)

(52) U.S. Cl. .................. 370/392; 370/395.31; 370/397; 370/409; 709/238; 709/242

(58) Field of Classification Search ................ 370/392, 370/395.31, 397, 409; 709/238, 242
See application file for complete search history.

(56) References Cited

U.S. PATENT DOCUMENTS

| | | | |
|---|---|---|---|
| 6,205,488 B1 | 3/2001 | Casey et al. | |
| 6,473,863 B1 | 10/2002 | Genty et al. | |
| 6,693,878 B1* | 2/2004 | Daruwalla et al. | 370/235 |
| 6,885,677 B1* | 4/2005 | Klevans | 370/466 |
| 6,947,428 B1* | 9/2005 | Andersson et al. | 370/395.5 |
| 6,999,454 B1* | 2/2006 | Crump | 370/389 |
| 7,116,665 B2* | 10/2006 | Balay et al. | 370/392 |
| 7,136,374 B1* | 11/2006 | Kompella | 370/352 |
| 7,151,775 B1* | 12/2006 | Renwick et al. | 370/400 |
| 7,161,946 B1* | 1/2007 | Jha | 370/401 |
| 7,203,762 B2* | 4/2007 | Yamada et al. | 709/238 |

(Continued)

FOREIGN PATENT DOCUMENTS

CA   2324805   10/2000

(Continued)

*Primary Examiner*—Alpus H. Hsu
(74) *Attorney, Agent, or Firm*—Sawyer Law Group LLP

(57) ABSTRACT

A system and method for transmitting data from a first site to a second site over a shared Multi-Protocol Label Switched (MPLS) network comprising a plurality of routers, including an ingress router in communication with the first site and an egress router in communication with the second site, includes configuring a plurality of label switching paths between the ingress router and the egress router over a plurality of label switching devices. The method further includes performing a first lookup on one of at least one virtual routing and forwarding (VRF) table stored in the ingress router, whereby the first lookup identifies one routing table from a plurality of routing tables stored in the ingress router, each routing table being associated with one of the plurality of label switched paths, and performing a second lookup on the one routing table, wherein the routing table defines the associated label switched path between the ingress router and the egress router for a virtual private network (VPN) between the first site and the second site.

28 Claims, 5 Drawing Sheets

U.S. PATENT DOCUMENTS

| | | |
|---|---|---|
| 2001/0002192 A1 | 5/2001 | Fujita |
| 2001/0007557 A1 | 7/2001 | Yamada et al. |
| 2001/0019554 A1 | 9/2001 | Nomura et al. |
| 2001/0024438 A1 | 9/2001 | Sugiyama et al. |
| 2001/0025319 A1 | 9/2001 | Takashima et al. |
| 2001/0026549 A1 | 10/2001 | Hameleers et al. |
| 2002/0099194 A1* | 7/2002 | Efstratiadis et al. ....... 536/23.2 |
| 2004/0059829 A1* | 3/2004 | Chu et al. .................. 709/238 |
| 2004/0059831 A1* | 3/2004 | Chu et al. .................. 709/242 |
| 2004/0088542 A1* | 5/2004 | Daude et al. ............... 713/156 |
| 2004/0174882 A1* | 9/2004 | Willis ..................... 370/395.5 |
| 2004/0177157 A1* | 9/2004 | Mistry et al. ............... 709/241 |

FOREIGN PATENT DOCUMENTS

| | | |
|---|---|---|
| WO | 0122658 | 3/2001 |

* cited by examiner

METHOD AND SYSTEM FOR SUPPORTING A DEDICATED LABEL SWITCHED PATH FOR A VIRTUAL PRIVATE NETWORK OVER A LABEL SWITCHED COMMUNICATION NETWORK

FIELD OF THE INVENTION

The present invention relates in general to networked data processing systems, and in particular to label switch paths (LSPs) for virtual private networks (VPNs) over a multi-protocol label switching (MPLS) network.

BACKGROUND OF THE INVENTION

As companies become more decentralized, there is a need to provide connectivity to employees located across the country and around the world. Traditionally, companies have established private intra-company communication networks by securing dedicated lines from a long-distance service provider, and/or setting up banks of remote-access servers and modems. Such measures are costly and not particularly scalable.

A virtual private network (VPN) offers an alternative solution to establishing an intra-company communication network. A VPN is a private connection between two machines or networks over a shared or public network, such as the Internet. VPNs allow a company to securely extend its network services over the Internet to remote users, branch offices, and partner companies. In essence, VPNs turn the Internet into a simulated private WAN so that employees in remote areas can easily gain access their company's private network simply by gaining access to the Internet. Cost savings are achieved because leased lines between remote sites and the company are not necessary. In addition, because access to the Internet is widespread, VPNs allow a company to add remote sites easily (i.e., high scalability) without expending costs for connectivity or hardware.

VPNs are implemented through a technique known as tunneling. In tunneling, a data packet from a first protocol is "wrapped" in a second packet from a second protocol before it enters the shared network. That is, a new header from a second protocol is attached to the first packet. The entire first packet becomes the payload of the second one. Tunneling is frequently used to carry traffic of one protocol over a network that does not support that protocol directly. For example, a Network Basic Input/Output System (NetBIOS) or Internet Packet Exchange (IPX) packet can be encapsulated in an Internet Protocol (IP) packet to tunnel it through the Internet. When the encapsulated data packet exits the shared network, the "wrapper" is removed, and the unwrapped data packet is forwarded to its destination address as usual.

For tunneling through the Internet, the data packet must be encapsulated in an IP packet. The IP packet is then forwarded from router to router based on a network layer address associated with the packet. For various reasons, this process is costly and time consuming.

Multi-Protocol Label Switching (MPLS) refers to a technique for tunneling a data packet through a network domain using labels instead of a network layer address. FIG. 1 is a block diagram illustrating a shared MPLS network 100. As is shown, a VPN (VPN1) exists between site 1 (110) and site 2 (112). Site 1 (110) can be an organization's private network in the United States and site 2 (112) can be that organization's remote office in London. In another case, site 2 (112) can be another Internet service provider (i.e., another public network). The shared MPLS network 100 provides a means through which traffic can travel from site 1 (110) to site 2 (112), via VPN1. While FIG. 1 illustrates only one VPN, those skilled in the art recognize that several VPNs generally traverse the network 100.

In MPLS, a Label Switched Path (LSP) 102 is a pre-established path from an ingress point border device 104 at the entry of the network 100 to an egress point border device 106 at the exit. The ingress and egress devices are referred to as Label Edge Routers (LERs). The LSP traverses a number of label switching devices 108a, 108b, which can be routers or switches, within the network 100. FIG. 1 illustrates a single LSP 102 for the sake of clarity. Those skilled in the art recognize that several LSPs can be established in a MPLS network 100, initiating and termination at multiple LERs, which are not shown.

Within an MPLS network 100, routes between ingress LERs 104 and egress LERs 106 are determined and then, as per normal MPLS operation, a label distribution protocol, e.g., Border Gateway Protocol (BGP), is invoked to establish implicit LSPs 102 across the MPLS network 100 which include intermediate hops (across label switching devices 108a, 108b) required to get from an ingress LER 104 to an egress LER 106. The manner in which routes and labels are distributed between LERs (104, 106) and label switching devices (108) is well known to those skilled in the art, and will not be discussed here.

When a packet enters an ingress LER 104, the ingress LER 104 examines the network address of the packet and, based on the IP destination address (e.g., the IP address for site 2 (112)), determines the appropriate egress LER 106 through which the packet should exit, which in turn, determines the appropriate LSP 102 for the packet. The ingress LER 104 then installs in the packet a label corresponding to the appropriate LSP 102, and forwards the packet to a first label switching device 108a in the LSP 102. Each subsequent label switching device along the LSP 102 uses the label to determine the next hop for the packet, and replaces the label in the packet with a new label corresponding to the next hop for the packet. When the packet finally reaches the egress LER 106, the egress LER 106 removes the label from the packet, and forwards the packet to the destination (e.g., site 2 (112)). Thus, only the ingress LER 104 processes the packet at the network layer, and subsequent devices process the packet based upon the label only.

Because the ingress LER 104 determines the LSP 102 using only the IP address of the egress LER 106, a single core LSP 102 between the ingress 104 and egress 106 LERs is established into which multiplexed traffic from different VPNs is passed. Thus, several VPNs must share the resources allocated for the core LSP 102, which can lead to usage problems if one VPN dominates the traffic across the LSP 102 and chokes off traffic from other VPNs. In addition, quality of service (QoS) issues arise in that service level agreements (SLAs) cannot be enforced over the shared network.

Accordingly, a need exists for an improved system and method which supports VPNs in a MPLS. The system and method should provide fairness between VPNs and QoS. The system should also be scalable and easy to implement. The method and system of the present invention addresses such a need.

SUMMARY OF THE INVENTION

The present invention is related to a system and method for transmitting data from a first site to a second site over a shared Multi-Protocol Label Switched (MPLS) network comprising a plurality of routers, including an ingress router in communication with the first site and an egress router in communication with the second site. The method includes configuring a plurality of label switching paths between the ingress router and the egress router over a plurality of label switching devices. The method further includes performing a first lookup on one of at least one virtual routing and forwarding (VRF) table stored in the ingress router, whereby the first lookup identifies one routing table from a plurality of routing tables stored in the ingress router, each routing table being associated with one of the plurality of label switched paths, and performing a second lookup on the one routing table, wherein the routing table defines the associated label switched path between the ingress router and the egress router for a virtual private network (VPN) between the first site and the second site.

DETAILED DESCRIPTION

The present invention relates generally to networked data processing systems, and in particular to label switch paths (LSPs) for virtual private networks (VPNs) in a multi-protocol label switching (MPLS) network. The following description is presented to enable one of ordinary skill in the art to make and use the invention and is provided in the context of a patent application and its requirements. While BGP connections will be discussed, those skilled in the art will recognize that there are other ways to accomplish the distribution of the VPN information. Various modifications to the preferred embodiments and the generic principles and features described herein will be readily apparent to those skilled in the art. Thus, the present invention is not intended to be limited to the embodiment shown but is to be accorded the widest scope consistent with the principles and features described herein.

Figure 1:
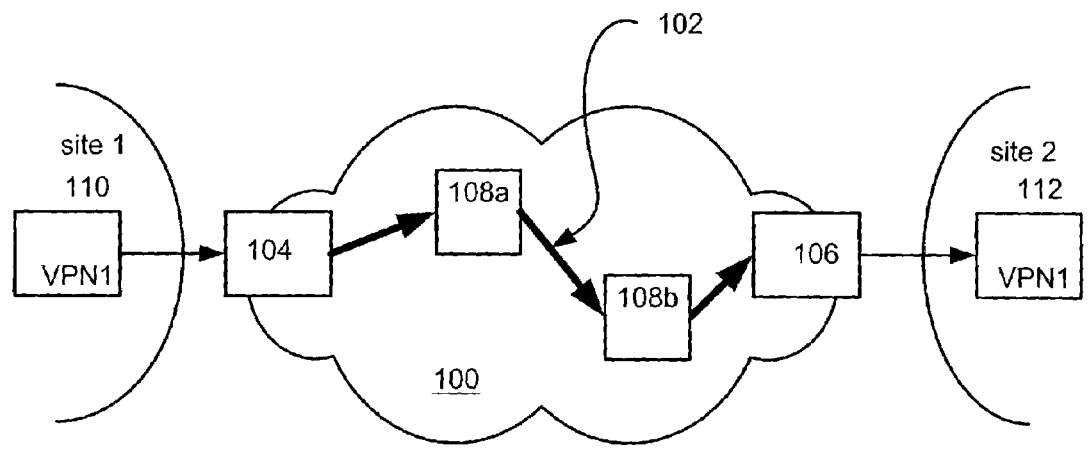
FIG. 1 is a block diagram of a MPLS network.
Figure 2:
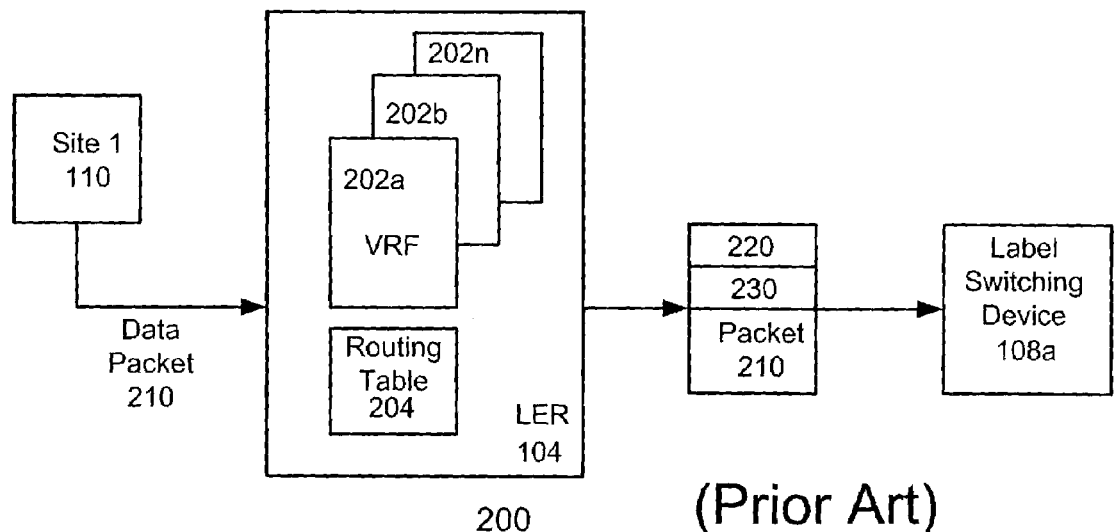
FIG. 2 is a block diagram of the ingress edge of the MPLS network.
Figure 2A:
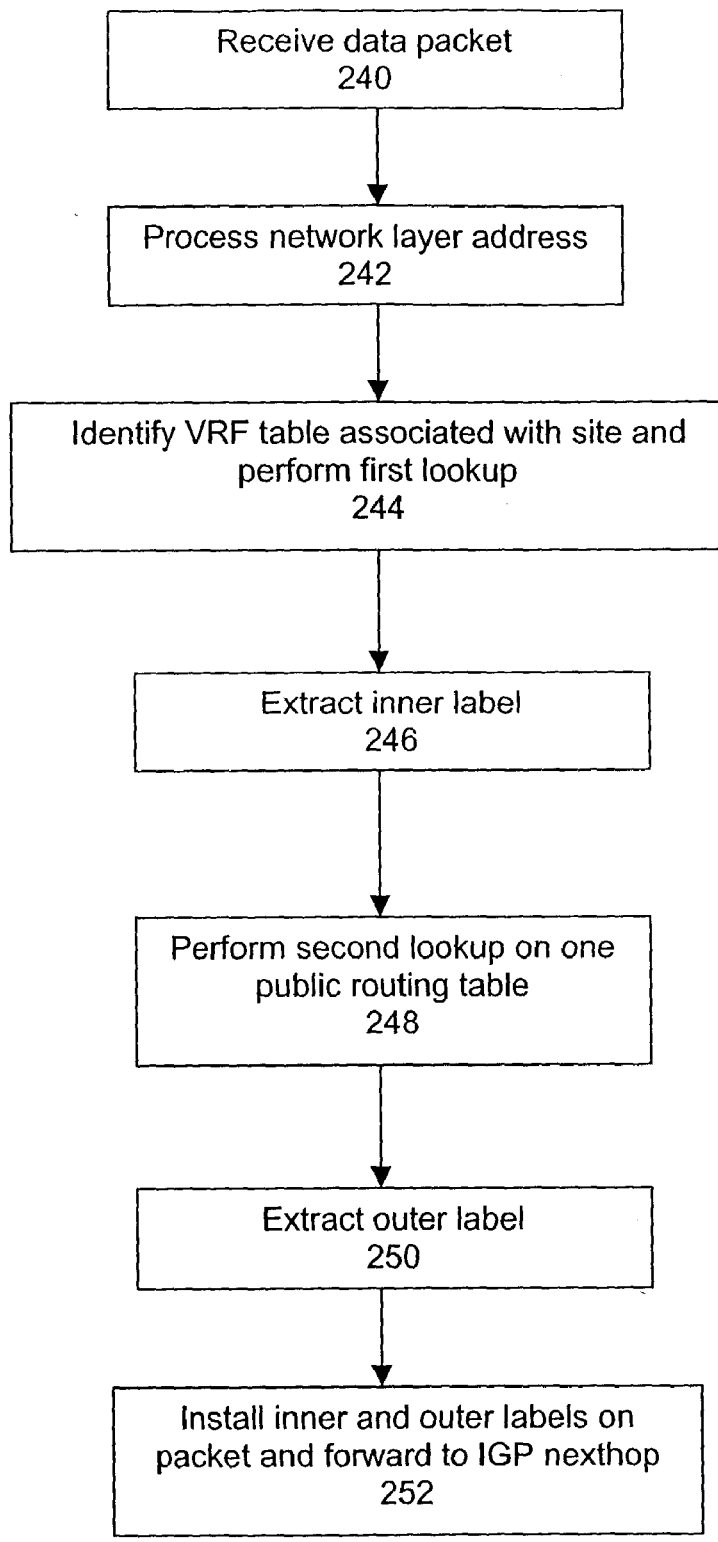
FIG. 2A is a flowchart illustrating a process for transmitting a data packet into a core LSP.

To more clearly describe the standard MPLS network and how data packets are transmitted therein, please refer to FIGS. 1 through 2A together with the following discussion. FIG. 2 is a block diagram of an ingress edge 200 of the MPLS network 100, where like components have like reference numerals. Conventional MPLS VPN implementation typically requires that IP data packets 210 belonging to a VPN are initially tagged with two MPLS label-stack entries (LSE or labels) by the ingress LER 104. The first, or outer, label 220 is used to tunnel the packet across a LSP 102 in the MPLS network 100. The second, or inner, label 230 is used only at the egress LER 106 to determine an outgoing VPN Routing and Forwarding (VRF) table/interface. This two level hierarchy improves scalability by allowing the externally learned routes to be kept only in the LERs (104, 106) so that the core label switching devices (108a, 108b) need keep only the internal routes required for routing between the LER pairs (104, 106).

Data packets 210 are forwarded to the network 100 from sites 110 outside of the network100. These sites 110 can be private networks associated with companies, or they can be other shared networks in the Internet. For the sake of clarity, only one site (110) is illustrated in FIGS. 1 and 2. The ingress LER 104 stores a plurality of VPN Routing and Forwarding (VRF) tables (202a, 202b, . . . 202n). Each VRF table (e.g., 202a) is associated with a site 110, and includes such information as VPN membership information, the inner label 230, and the egress LER 106 nexthop. The ingress LER 104 also includes one public routing table 204, which is shared by all VPNs traversing the network 100. The public routing table 204 provides LSPs between the ingress LER 104 and different egress LERs (e.g., 106) and includes outer labels 220 for the LSPs 102.

FIG. 2A illustrates a flowchart of a process for transmitting a data packet 210 into a LSP 102. The process starts in step 240, when a data packet 210 from site 1 (110) is received by the ingress LER 104. In ingress LER 104 processes the packet's 210 network layer address in step 242, and after it identifies the VRF table 202a associated with site 1 (110), performs a first lookup on the VRF table 202a in step 244. The IP destination address of the packet 210, i.e. the IP address of site 2 (112), is matched with an entry in site 1's VRF table 202a. This lookup results in the egress LER 106 nexthop, i.e., the IP address of egress LER 106, and the inner label 230. In step 246, the ingress LER 104 extracts the inner label 230. Next, in step 248, the ingress LER 104 performs a second lookup on the one public routing table 204 using the egress LER 106 nexthop from the first lookup to determine the outer label 220 that defines the LSP 102 between the ingress LER 104 and the egress LER 106. The outer label is extracted in step 250. After the ingress LER 104 has performed the two lookups, it installs the inner 230 and outer 220 labels onto the data packet 210, and forwards the packet 210 to the first label switching device 108a in the LSP 102, via step 252. From this point forward, the packet 210 hops from label switching device 108a to label switching device 108b until it reaches the egress LER 106, where the outer label 220 is removed and the inner label 230 is used to transmit the data packet 210 to the destination, e.g., site 2 (112).

Figure 3:
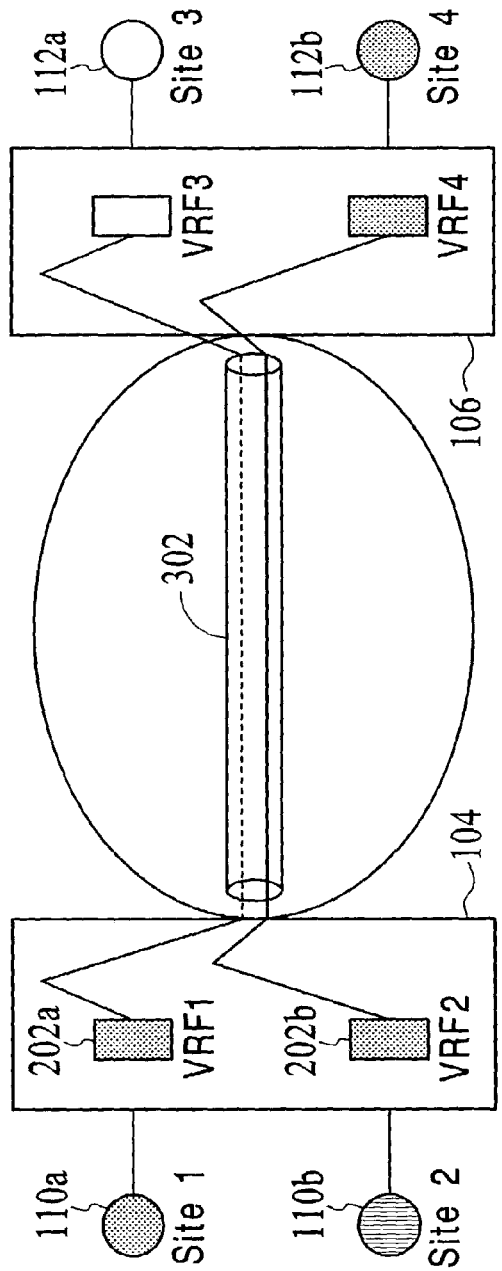
FIG. 3 is a schematic diagram of the MPLS network with one core LSP.

FIG. 3 is a schematic diagram of the MPLS network 300 described above, where like components share like reference numerals. Because the outer label 220 is derived from the one public routing table 204 shared by all VPNs, only one LSP 302 between the ingress 104 and egress 106 LERs is established for all traffic from different VPNs traversing the network 100 through the ingress LER 104 and the egress LER 106. As discussed above, this can lead to fairness and QoS problems.

Figure 4:
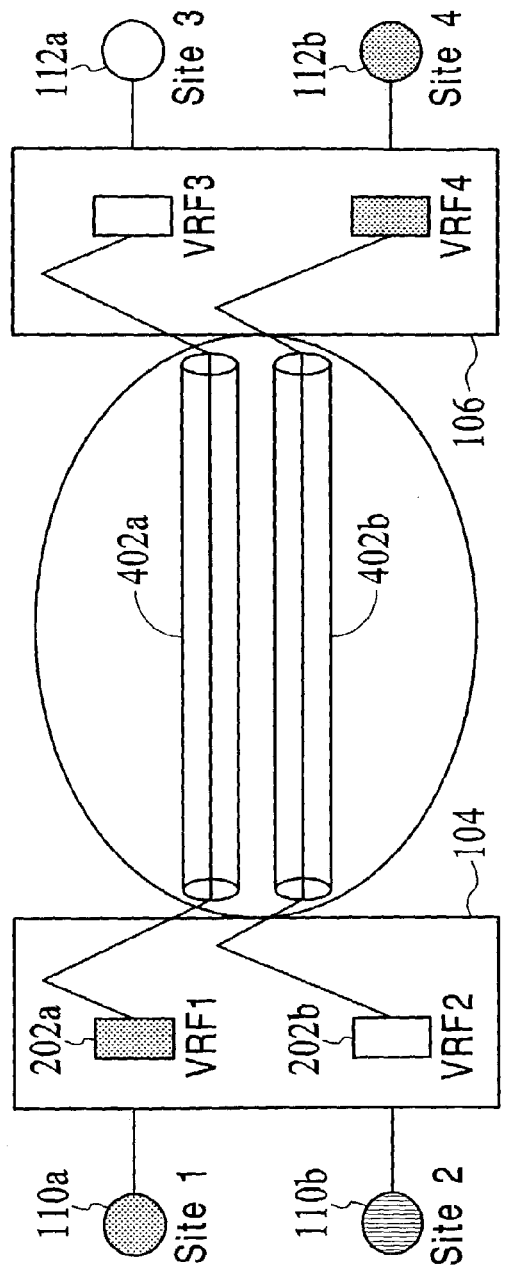
FIG. 4 is a schematic diagram of an MPLS network in accordance to a preferred embodiment of the present invention.

According to a preferred embodiment of the present invention, these problems are addressed by configuring a plurality of LSPs between the ingress 104 and egress 106 LERs so that all data traffic is not confined to a single LSP 302. FIG. 4 is a schematic diagram of the MPLS network configuration 400 in accordance with a preferred embodiment of the present invention, where like components share like reference numerals. As is shown, a plurality of LSPs (402a, 402b) are established between the ingress 104 and egress 106 LERs. In a preferred embodiment, a dedicated LSP 402a can be configured for a particular VPN traversing the network 400 through ingress LER 104 and egress LER 106. Thus, all data traffic for a VPN connecting site 1 (110a) to site 3 (112a) will travel along a first LSP 402a, and data traffic for a VPN connecting site 2 (110b) to site 4 (112b) will travel along a second LSP 402b. In this manner, data traffic for a particular VPN can be regulated and service levels can be enforced.

Figure 5:
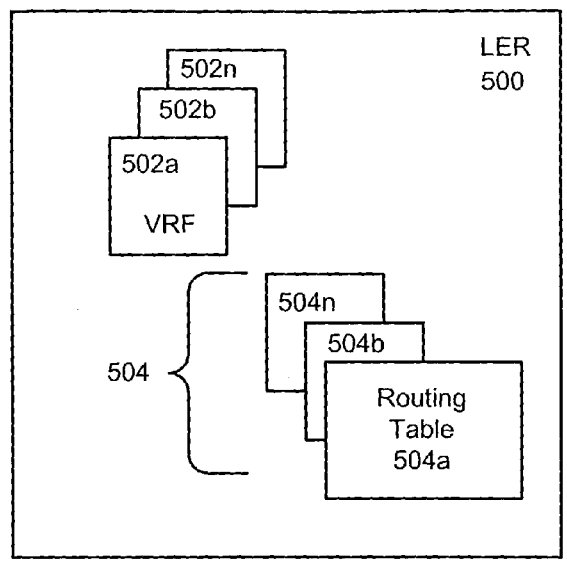
FIG. 5 is a block diagram of an ingress LER in accordance to a preferred embodiment of the present invention.

To describe the implementation of the dedicated LSPs 402a, 402b, please refer to FIG. 5, which is a block diagram of an ingress LER 500 in accordance with a preferred embodiment of the present invention. As is shown, the ingress LER 500 includes VRF tables (502a, 502b . . . 502n), which as before, are associated with sites (110a, 110b) connected to the ingress LER 500. The ingress LER 500 also includes a plurality of routing tables (504a, 504b . . . 504n). In a preferred embodiment, each routing table (e.g., 504a) defines a different LSP (402a, 402b) between the ingress 500 and egress 106 LERs. In a preferred embodiment, a routing table (504a) is associated with a VPN, whereby the LSP 402a defined by the routing table 504a would be reserved for the associated VPN's data traffic.

Figures 6A, 6B:
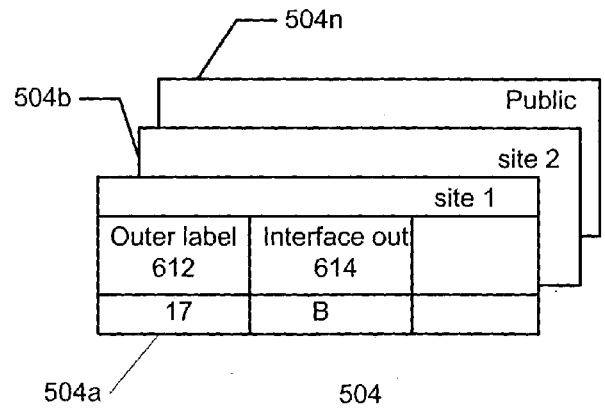
FIG. 6A is diagram of a VRF table according to a preferred embodiment of the present invention.
FIG. 6B is a diagram of a series of routing tables according to a preferred embodiment of the present invention.

FIG. 6A illustrates an exemplary VRF table 502a for site 1 (110a) in accordance with a preferred embodiment of the present invention. As is shown, the VRF table 502a includes an Inner Label column 602, a LER Nexthop (LER_NH) column 604, and a Table ID column 606. Those skilled in the art recognize that the VRF table 502a could also include additional columns which would contain other relevant information pertaining to the site 110a and/or the associated VPN. The Inner Label column 602 identifies the outgoing VRF table and interface to be used by the egress LER 106 in order to forward the packet to the correct destination address (i.e., address of site 3 (112a)), and the LER_NH column 604 indicates the IP address of the egress LER 106. The Table ID column 606 identifies which routing table (504a, 504b, . . . 504n) should be utilized for the second lookup.

FIG. 6B is a diagram of the plurality of exemplary routing tables 504a, 504b, 504n referred to by the Table ID column 606. Each routing table (504a, 504b) provides information that defines a different LSP (402a, 402b) between the ingress LER 500 and the egress LER 106. An Outer Label column 612 provides the outer label 220 for the data packet 210, which is used to tunnel the data packet 210 across the LSP 402a associated with the routing table 504a. Additional columns, such as an Interface Out column 614, may be provided to facilitate tunneling.

As stated above, a routing table (e.g., 504a) can be associated with a particular VPN and defines a dedicated LSP 402a for the data traffic across the VPN. In another preferred embodiment, a routing table (e.g., 610b) can define a dedicated LSP 402b for certain types of data traffic, e.g. streaming video, across a VPN. In one other preferred embodiment, one of the plurality of routing tables 504n is a default routing table, which defines a common LSP 302 that is not associated with any particular VPN. In other words, the common LSP 302 is the standard LSP 302 that is determined by the egress LER 106.

Figure 7:
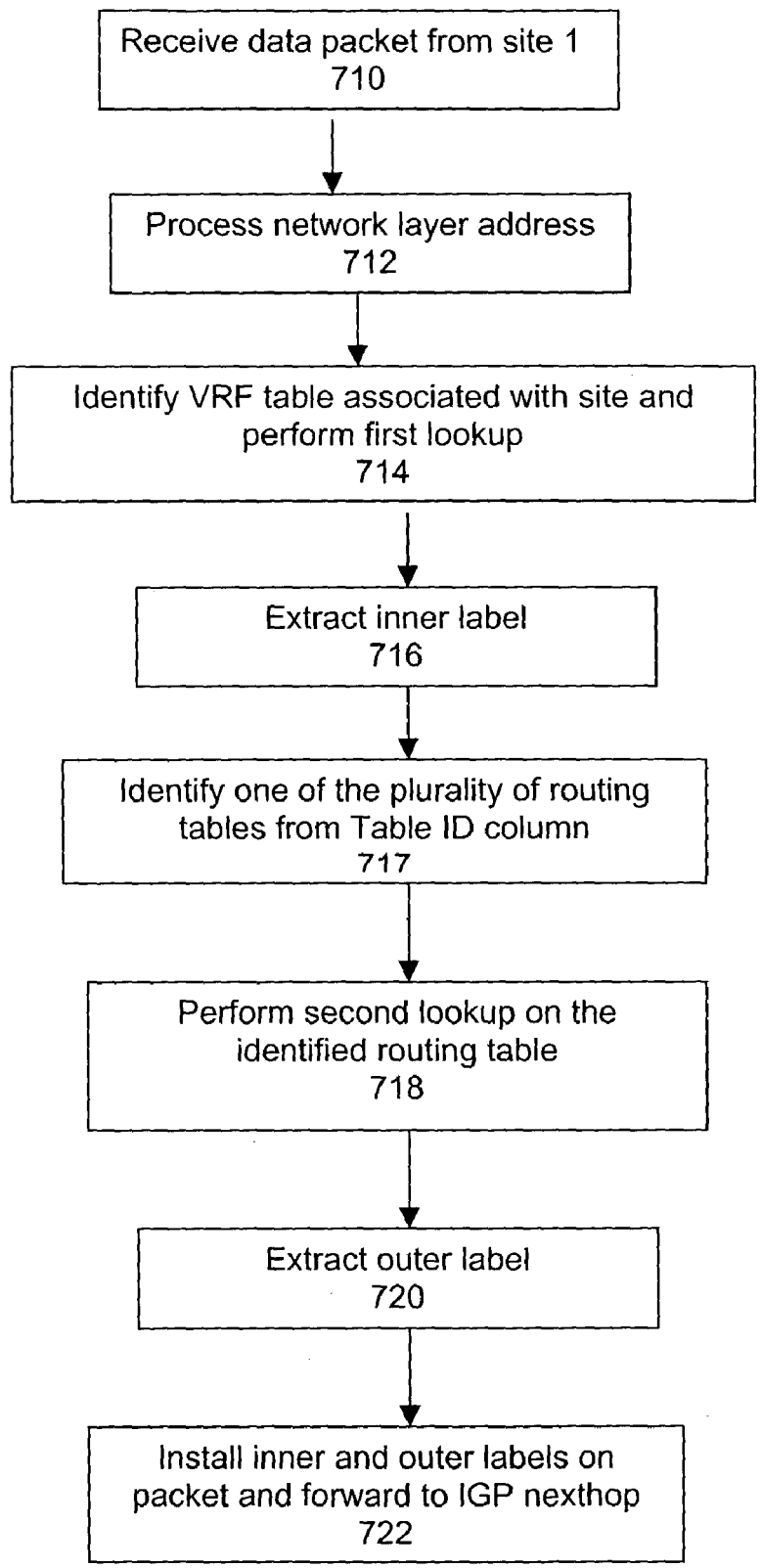
FIG. 7 is a flow chart illustrating a process for configuring an LSP for a VPN in accordance with a preferred embodiment of the present invention.

FIG. 7 is a flowchart illustrating a process for configuring a dedicated LSP for a VPN in accordance with a preferred embodiment of the present invention. The process begins when the ingress LER 500 receives a data packet 210 from a site, in this case, site 1 (110a) in step 710. The ingress LER 500 processes the packet's network layer address in step 712 to identify the VRF table 502a associated with site 1 (110a), and performs a first lookup on the VRF table 502a in step 714. The IP destination address of the data packet 210 received from site 1 (110a) is matched with an entry in the VRF table 502a that identifies an inner label 230 and the LER nexthop. The inner label 230 is extracted in step 716.

In step 717, one routing table 504a from the plurality of routing tables 504 is identified via a value in the Table ID column 606 (FIG. 6A) in the VRF table 502a. In step 718, the ingress LER 500 performs a second lookup on the routing table 504a designated in the Table ID column 606. The designated routing table 504a identifies the LSP 402a between the ingress LER 500 and egress LER 106, and includes the outer label 220 used to tunnel the data packet 210 across the network 400. In step 720, the outer label 220 is extracted. The ingress LER 500 tags the data packet 210 with the inner 230 and outer 220 labels and forwards the data packet 210 to the first label switching device 108a in the LSP 402a, via step 722. From this point forward, the data packet is tunneled across the LSP 402a between ingress LER 500 and egress LER 106.

According to the preferred embodiment of the present invention, a network provider can enforce service level agreements and provide guaranteed bandwidth to customers that request such services because data traffic for a particular customer can be tunneled through a dedicated LSP between ingress 500 and egress 106 LERs. Moreover, by providing a plurality of LSPs between an ingress/egress LER pair, network providers can more efficiently regulate data flow across the network and offer superior QoS.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for transmitting a data packet from a first site to a second site over a shared Multi-Protocol Label Switched (MPLS) network, the shared MPLS network comprising a plurality of routers, the plurality of routers including an ingress router in communication with the first site and an egress router in communication with the second site, the method comprising the steps of:

(a) configuring a plurality of label switched paths between the ingress router and the egress router over a plurality of label switching devices;

(b) upon receiving the data packet from the first site, performing a first lookup on at least one private virtual routing and forwarding (VRF) table stored in the ingress router, wherein the first lookup identifies one routing table from a plurality of routing tables stored in the ingress router, wherein each routing table is associated with one of the plurality of label switched paths; and (c) performing a second lookup on the one routing table, wherein the one routing table defines the associated label switched path between the ingress router and the egress router for a virtual private network (VPN) between the first site and the second site.

2. The method of claim 1, wherein the first lookup step (b) includes the steps of:

(b1) processing a network address layer associated with the data packet to identify the at least one VRF table, wherein the network address layer includes an IP destination address for the second site;

(b2) matching the IP destination address with an entry in the at least one VRF table; and (b3) identifying an inner label based on the entry, wherein the inner label is used by the egress router to forward the data packet to the second site.

3. The method of claim 2, wherein the first lookup step (b) further includes:

(b4) identifying the one routing table for the second lookup based on the entry.

4. The method of claim 3, wherein identifying step (b4) includes: (b4i) checking a value in a Table ID column in the at least one VRF table, wherein the value in the Table ID column identifies the one routing table.

5. The method of claim 2, wherein the second lookup step (c) includes: (c1) identifying an outer label, wherein the outer label defines the associated label switched path between the ingress router and the egress router.

6. The method of claim 5 further including the steps of:

(d) installing the inner label and the outer label onto the data packet; and (e) forwarding the data packet to a first label switching device on the associated label switched path.

7. The method of claim 1, wherein the at least one VRF table is associated with the first site and defines a virtual private network (VPN) between the first site and the second site.

8. The method of claim 7, wherein at least one of the plurality of routing tables is associated with the VPN between the first site and the second site.

9. The method of claim 8, wherein at least one of the plurality of routing tables is a public shared by all VPNs traversing the MPLS network through the ingress router and the egress router.

10. A computer readable medium encoded with computer executable program instructions for transmitting a data packet from a first site to a second site over a shared Multi-Protocol Label Switched (MPLS) network, the shared MPLS network comprising a plurality of routers, the plurality of routers including an ingress router in communication with the first site and an egress router in communication with the second site, comprising the instructions for:

(a) configuring a plurality of label switched paths between the ingress router and the egress router over a plurality of label switching devices; (b) upon receiving the data packet from the first site, performing a first lookup on at least one private virtual routing and forwarding (VRF) table stored in the ingress router, wherein the first lookup identifies one routing table from a plurality of routing tables stored in the ingress router, wherein each routing table is associated with one of the plurality of label switched paths; and (c) performing a second lookup on the one routing table, wherein the one routing table defines the associated label switched path between the ingress router and the egress router for a virtual private network (VPN) between the first site and the second site.

11. The computer readable medium of claim 10, wherein the first lookup instruction (b) includes instructions for:

(b1) processing a network address layer associated with the data packet to identify the at least one VRF table, wherein the network address layer includes an IP destination address for the second site;

(b2) matching the IP destination address with an entry in the at least one VRF table; and (b3) identifying an inner label based on the entry, wherein the inner label is used by the egress router to forward the data packet to the second site.

12. The computer readable medium of claim 11, wherein the first lookup instruction (b) further includes:

(b4) identifying the one routing table for the second lookup based on the entry.

13. The computer readable medium of claim 12, wherein identifying instruction (b4) includes:

(b4i) checking a value in a Table ID column in the at least one VRF table, wherein the value in the Table ID column identifies the one routing table.

14. The computer readable medium of claim 11, wherein the second lookup instruction (c) includes: (c1) identifying an outer label, wherein the outer label defines the associated label switched path between the ingress router and the egress router.

15. The computer readable medium of claim 14 further including instructions for:

(d) installing tile inner label and the outer label onto the data packet; and (e) forwarding the data packet to a first label switching device on the associated label switched path.

16. The computer readable medium of claim 10, wherein the at least one VRF table is associated with the first site and defines a virtual private network (VPN) between the first site and the second site.

17. The computer readable medium of claim 16, wherein at least one of the plurality of routing tables is associated with the VPN between the first site and the second site.

18. The computer readable medium of claim 17, wherein at least one of the plurality of routing tables is a public routing table shared by all VPNs traversing the MPLS network through the ingress router and the egress router.

19. A system for transmitting data from a first site to a second site over a shared Multi-Protocol Label Switched (MPLS) network, comprising:

a plurality of routers in communication with the shared MPLS network, the plurality of routers comprising an ingress router in communication with the first site and an egress router in communication with the second site;

a plurality of label switching devices defining a plurality of label switched paths between the ingress router and the egress router;

at least one virtual routing and forwarding (VRF) tables stored in the ingress router, wherein one of the at least one VRF tables is associated with the first site and identifies a virtual private network (VPN) between the first site and the second site; and a plurality of routing tables stored in the ingress router, wherein each of the routing tables is associated with one of the plurality of label switched paths between the ingress router and the egress router.

20. The system of claim 19, wherein at least one of the plurality of routing tables is associated with the VPN between the first site and the second site.

21. The system of claim 19, wherein each VRF table includes a Table ID column.

22. The system of claim 21, wherein a value in the Table ID column indicates which one of the plurality of routing tables is associated with the VPN between the first site and the second site.

23. The system of claim 22, wherein the one VRF table further includes information related to the first site and the second site.

24. The system of claim 23, wherein the information in the one VRF table is based on an IP destination address for the second site and includes an IP address for the egress router.

25. The system of claim 24, wherein the value in the Table ID column is based on the IP address for the egress router.

26. The system of claim 19, wherein the one VRF table provides an inner label for use by the egress router.

27. The system of claim 20, wherein each of the at least one routing tables provides an outer label used to tunnel the data across the MPLS network.

28. The system of claim 20, wherein at least one of the plurality of routing tables is a public routing table shared by all VPNs traversing the MPLS network through the ingress router and the egress router.

* * * * *